(12) United States Patent
Liobe et al.

(10) Patent No.: US 12,326,525 B2
(45) Date of Patent: *Jun. 10, 2025

(54) DETECTION PIXELS AND PIXEL SYSTEMS

(71) Applicant: Sensors Unlimited, Inc., Princeton, NJ (US)

(72) Inventors: John Liobe, Newton, NJ (US); Rui Zhu, Princeton, NJ (US)

(73) Assignee: Sensors Unlimited, Inc., Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/380,597

(22) Filed: Oct. 16, 2023

(65) Prior Publication Data
US 2024/0036176 A1  Feb. 1, 2024

Related U.S. Application Data

(63) Continuation of application No. 16/790,520, filed on Feb. 13, 2020, now Pat. No. 11,789,130.

(51) Int. Cl.
  *G01S 7/487* (2006.01)
  *G01S 7/4861* (2020.01)
  (Continued)

(52) U.S. Cl.
  CPC .......... *G01S 7/4873* (2013.01); *G01S 7/4861* (2013.01); *G01S 7/4865* (2013.01); *G01S 17/10* (2013.01); *G01S 17/89* (2013.01)

(58) Field of Classification Search
  None
  See application file for complete search history.

(56) References Cited

U.S. PATENT DOCUMENTS 9,232,165 B2  1/2016  Saito et al.
10,386,486 B2  8/2019  Price et al.
(Continued)

FOREIGN PATENT DOCUMENTS

CN  110261864 A  9/2019
EP  0578150 A2  1/1994
(Continued)

OTHER PUBLICATIONS

Grant et al.: Physics in Medicine & Biology 59 "A New Dual Threshold Time-Over-Threshold Circuit for Fast Timing in PET", Jun. 3, 2014 (Jun. 3, 2014), pp. 3421-3430.

(Continued)

*Primary Examiner* — Mohammad J Rahman

(57) ABSTRACT

A pixel system for an imaging device can include one or more pixels comprising a pulse trigger assembly configured to detect a pulse at one or more threshold voltages, a timer system forming part of and/or connected to the one or more pixels, the timer system comprising one or more trigger switches. The pulse trigger assembly can be configured to activate the one or more trigger switches in response to detecting the pulse at the one or more threshold values. The pixel system can include a time-of-flight (TOF) module operatively connected to the one or more pixels and/or the timer system to determine a TOF based on an output from the timer system while simultaneously performing either or both passive imaging and asynchronous laser pulse detection.

20 Claims, 7 Drawing Sheets

(51) Int. Cl.
  *G01S 7/4865* (2020.01)
  *G01S 17/10* (2020.01)
  *G01S 17/89* (2020.01)

(56) References Cited

U.S. PATENT DOCUMENTS

| | | | |
|---|---|---|---|
| 10,488,260 B1* | 11/2019 | Vakhshoori | G01J 3/0208 |
| 2002/0196170 A1* | 12/2002 | McIlrath | H04N 25/772 |
| | | | 348/E3.018 |
| 2012/0104260 A1* | 5/2012 | Balakrishnan | G01T 1/1647 |
| | | | 250/362 |
| 2012/0228484 A1* | 9/2012 | Burr | G01T 1/248 |
| | | | 250/363.01 |
| 2012/0261553 A1 | 10/2012 | Elkind et al. | |
| 2015/0116695 A1 | 4/2015 | Bartolome et al. | |
| 2016/0054434 A1 | 2/2016 | Williams et al. | |
| 2016/0205378 A1 | 7/2016 | Nevet et al. | |
| 2016/0363654 A1 | 12/2016 | Wyland | |
| 2017/0176575 A1 | 6/2017 | Smits | |
| 2018/0128921 A1 | 5/2018 | Mattioli Della Rocca et al. | |
| 2018/0194080 A1* | 7/2018 | El-Siblani | B33Y 50/02 |
| 2018/0275255 A1* | 9/2018 | Yates | G01S 7/4865 |
| 2018/0306920 A1 | 10/2018 | Kramper et al. | |
| 2019/0113605 A1 | 4/2019 | Liobe et al. | |
| 2019/0182415 A1* | 6/2019 | Sivan | G06F 3/013 |
| 2020/0018853 A1 | 1/2020 | Hata et al. | |
| 2020/0109987 A1 | 4/2020 | Willassen et al. | |
| 2020/0142038 A1 | 5/2020 | Han et al. | |
| 2020/0294359 A1* | 9/2020 | Bulzacki | G07F 17/3258 |
| 2021/0210543 A1 | 7/2021 | Hseih et al. | |
| 2022/0059334 A1* | 2/2022 | Bedford | H01J 49/0031 |

FOREIGN PATENT DOCUMENTS

| | | |
|---|---|---|
| EP | 2512125 A2 | 10/2012 |
| FR | 2927196 A1 | 8/2009 |
| JP | 2000227483 A | 8/2000 |
| JP | 2013058909 A | 3/2013 |
| JP | 2013175936 A | 9/2013 |
| JP | 2016080651 A | 5/2016 |
| JP | 2016092593 A | 5/2016 |
| WO | 2015079597 A1 | 6/2015 |

OTHER PUBLICATIONS

Parahyba et al: International Conference on Space Optics "Time-of-flight Calibration of an MCT-APD Sensor for a Flash Imaging LiDAR System", Proc. of SPIE vol. 11180 & 111802K, Oct. 9-12, 2018 (Oct. 9-12, 2018), pp. 1-7.

De Borniol et al: SPIEDigital Library.org, "HgCdTe-based APD focal plane array for 2D and 3D active imaging: first results on a 320x256 with 30 μm pitch demonstrator", Proc. of SPIE vol. 7660, 76603D, May 3, 2010 (May 3, 2010), pp. 1-10.

Extended European searh report issued in corresponding EP application No. 21156613.8, Dated Jun. 15, 2021.

EP communication issued in corresponding EP application No. 21156613.8, dated Aug. 11, 2023.

Office Action issued Jun. 4, 2024 in connection with Japanese Patent Application No. 2021-021511, 11 pages.

Office Action dated Apr. 3, 2025 in connection with Chinese Patent Application No. 202110186787.5, 28 pages.

* cited by examiner

DETECTION PIXELS AND PIXEL SYSTEMS

CROSS REFERENCE TO RELATED APPLICATIONS

This application is a continuation of U.S. patent application Ser. No. 16/790,520, filed Feb. 13, 2020, the entire content of which is incorporated herein by reference.

FIELD

This disclosure relates to pixels, more specifically to detection pixels and pixel systems.

BACKGROUND

Certain pixel designs can be made to detect active illumination, e.g., laser pulses, not just passive illumination. Traditional designs can only detect that a pulse has occurred, but cannot properly detect a time of flight, and therefore, distance cannot be accurately measured.

Such conventional methods and systems have generally been considered satisfactory for their intended purpose. However, there is still a need in the art for improved detection pixels and pixel systems. The present disclosure provides a solution for this need.

SUMMARY

In accordance with at least one aspect of this disclosure, a pixel system for an imaging device can include one or more pixels comprising a pulse trigger assembly configured to detect a pulse at one or more threshold voltages, a timer system forming part of and/or connected to the one or more pixels, the timer system comprising one or more trigger switches. The pulse trigger assembly can be configured to activate the one or more trigger switches in response to detecting the pulse at the one or more threshold values. The pixel system can include a time-of-flight (TOF) module operatively connected to the one or more pixels and/or the timer system to determine a TOF based on an output from the timer system.

The timer system can include at least one voltage ramp configured to allow the TOF module to determine a TOF of a signal based on a voltage value of the at least one voltage ramp that changes over time. The timer system can include one or more analog-digital converter (ADCs), wherein the one or more ADCs are configured to receive a voltage value from the at least one voltage ramp when the one or more trigger switches are activated by the pulse.

The one or more pixels can include a voltage buffer connected to the at least one voltage ramp, a column buffer connected to each of the one or more ADCs, and a ramp capacitor connected to the column buffer. The one or more trigger switches can be disposed between each column buffer and the voltage buffer connected to the at least one voltage ramp.

The pulse trigger assembly can include a diode, an amplifier connected to the diode to receive a voltage therefrom, one or more hi-pass filters connected to the amplifier, a comparator for each of the one or more threshold voltages, and a voltage threshold trigger line connecting a respective comparator to a respective trigger switch of the one or more trigger switches. The pulse trigger assembly can include one or more TOF mode switches configured to selectively allow the one or more trigger switches to be operated.

The one or more trigger switches can include a first trigger switch and a second trigger switch connected to a first comparator and a second comparator, respectively, and configured to be activated at a first threshold voltage of the pulse and a second threshold voltage of the pulse, respectively. The one or more TOF mode switches can include a first TOF switch and a second TOF switch. In a first TOF mode, the first TOF switch can be activated such that the first trigger switch can be activated. In a second TOF mode, the second TOF switch can be activated such that the second trigger switch can be activated.

The pulse trigger assembly can include an asynchronous laser pulse detection (ALPD) system selectively connected to the first threshold trigger voltage line via an ALPD mode switch. The ALPD system can be connected between the first comparator and the first TOF mode switch. The first TOF mode switch can be between the first comparator and the first trigger switch. The second TOF mode switch can be connected between the amplifier and the second comparator.

The pixel can include a passive imaging system connected to the diode. The passive imaging system includes at least one passive imaging mode switch configured to allow a passive imaging signal from the diode to be output to at least one of the one or more ADCs in a passive imaging mode. The pixel can be configured such that the passive imaging mode can be activated with the first TOF mode, but not with the second TOF mode, and the ALPD mode can be activated with the passive imagine mode.

The one or more pixels can be configured such that first TOF mode and the second TOF mode are activatable together to provide multi-threshold readings to allow the TOF module to reduce or eliminate one or more errors. In certain embodiments, the one or more high pass filters can include a single high pass filter operatively connected to each comparator. The voltage ramp can be connected to a passive imaging line by a ramp switch in front of the voltage buffer.

In accordance with at least one aspect of this disclosure, a pixel can include any suitable embodiment of a pixel disclosed herein (e.g., as described above). For example, a pixel can include a pulse trigger assembly configured to detect a pulse at one or more threshold voltages, and a timer system connected to the pulse trigger assembly, the timer system comprising one or more trigger switches. The pulse trigger assembly can be configured to activate the one or more trigger switches in response to detecting the pulse at the one or more threshold values. The timer system can include a voltage buffer configured to connect to at least one voltage ramp, one or more column buffers configured to connect one or more respective analog-digital converters (ADCs), wherein the one or more trigger switches are disposed between each column buffer and the voltage buffer, and one or more ramp capacitors connected to each column buffer for receiving a voltage from the voltage ramp. The pulse trigger assembly can include a diode, an amplifier connected to the diode to receive a voltage therefrom, one or more hi-pass filters connected to the amplifier, a comparator for each of the one or more threshold voltages, a voltage threshold trigger line connecting a respective comparator to a respective trigger switch of the one or more trigger switches, and one or more TOF mode switches configured to selectively allow the one or more trigger switches to be operated. The one or more trigger switches can include a first trigger switch and a second trigger switch connected to a first comparator and a second comparator, respectively, and configured to be activated at a first threshold voltage of the pulse and a second threshold voltage of the pulse, respectively.

In accordance with at least one aspect of this disclosure, a method can include determining a time-of-flight (TOF) of an output signal by first determining that a pulse was received at a pixel at two or more threshold voltages to determine a single time value of receiving the pulse. The method can then include using a voltage ramp to compare an initial voltage to a ramp voltage at the single time value of receiving the pulse to determine a voltage difference and then correlating the voltage difference the TOF based on correlation data. The method can further include selecting between a TOF multi-threshold mode and a different mode of operation. The method can include any other suitable method(s) and/or portion(s) thereof.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
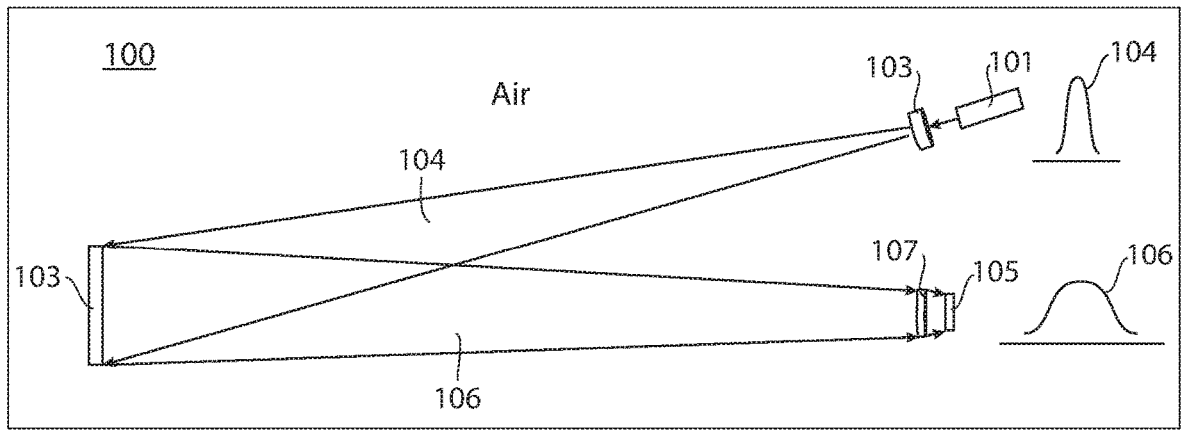
FIG. 1 is a schematic diagram of an embodiment of an imaging system in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-7. Certain embodiments described herein can be used to provide accurate time-of-flight (TOF) measurements (e.g., for laser pulses), to provide pulse detection, passive imaging, and/or for any other suitable use.

Referring to FIG. 1, an embodiment of a system 100 can include a one or more laser sources 101 (e.g., providing a Gaussian shape pulse) connected to one or more optics 103 to output a laser pulse 104 to a target 103 (e.g., through air) having a certain reflectance and distance from the laser source 101. The system 100 can include an imaging device 105 connected to one or more optics 107 for receiving the reflected laser pulse 106. In certain embodiments, the system 100 can be configured to operate with targets at any suitable distance and with any suitable resolution.

Figure 2:
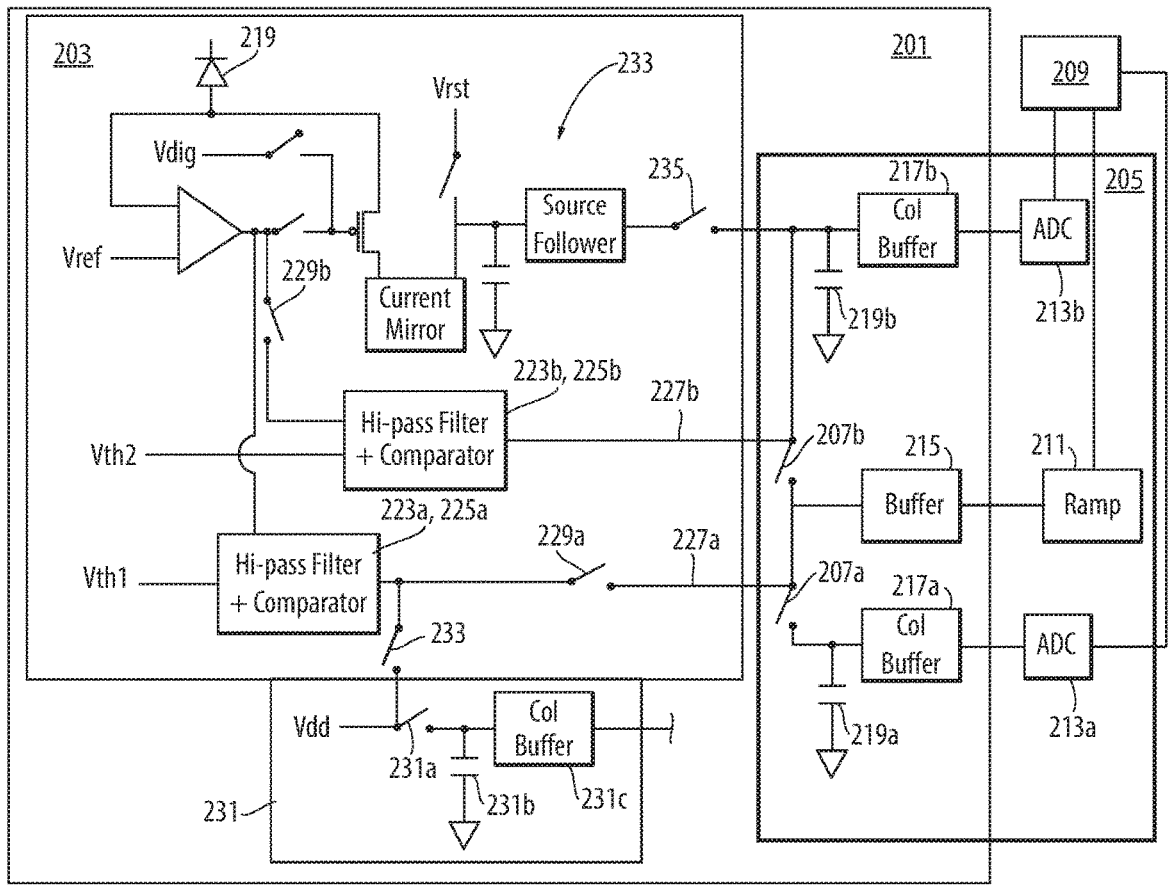
FIG. 2 is a schematic diagram of an embodiment of a system in accordance with this disclosure.
Figure 4:
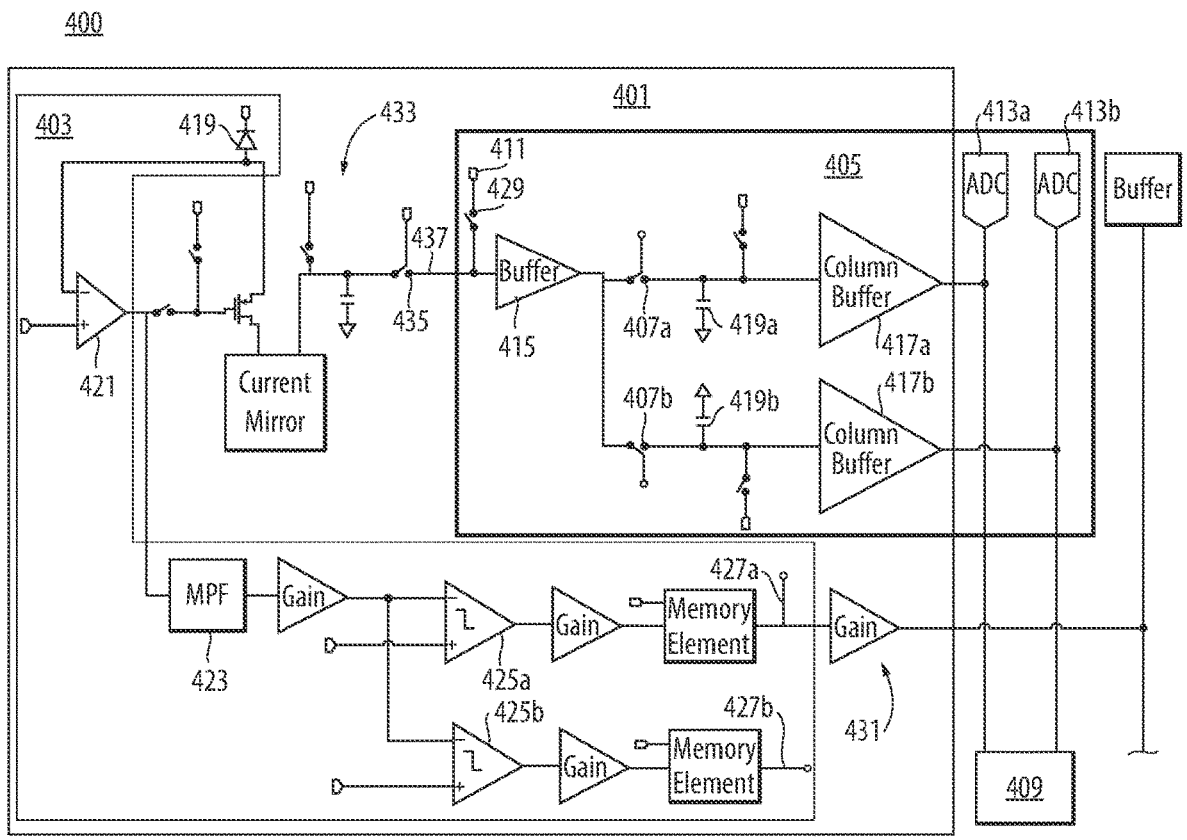
FIG. 4 is a schematic diagram of an embodiment of a system in accordance with this disclosure.

In accordance with at least one aspect of this disclosure, referring to FIGS. 2 and 4 a pixel system 200, 400 for an imaging device (e.g., imaging device 105) can include one or more pixels 201, 401 comprising a pulse trigger assembly 203, 403 configured to detect a pulse at one or more threshold voltages (e.g., $V_{th1}$ and/or $V_{th2}$). The pixel system 200, 400 can include a timer system 205, 405 forming part of and/or connected to the one or more pixels 201, 401. The timer system 205, 405 can include one or more trigger switches 207a, 207b, 407a, 407b. The pulse trigger assembly 203, 403 can be configured to activate the one or more trigger switches 207a, b, 407a, b in response to detecting the pulse at the one or more threshold values.

The pixel system 100 can include a time-of-flight (TOF) module 209, 409 operatively connected to the one or more pixels 203, 403 and/or the timer system 205, 405 to determine a TOF based on an output from the timer system 205, 405. The TOF module 209, 409 can include any suitable computer hardware and/or software configured to perform any suitable function (e.g., as disclosed herein).

The timer system 205, 405 can include at least one voltage ramp 211, 411 configured to allow the TOF module 209 to determine a TOF of a signal based on a voltage value of the at least one voltage ramp 211 that changes over time. The timer system 205, 405 can include one or more analog-digital converters (ADCs) 213a, 213b, 413a, 413b. The one or more ADCs 213a, b, 413a, b can be configured to receive a voltage value from the at least one voltage ramp 211 when the one or more trigger switches 207a, b, 407a, b are activated by the pulse.

For example, in certain embodiments, the one or more pixels 203, 403 can include a voltage buffer 215, 415 connected to the at least one voltage ramp 211, 411, a column buffer 217a, 217b, 417a, 417b connected to each of the one or more ADCs 213a, b, 413a, b and a ramp capacitor 219a, 219b, 419a, 419b connected to the column buffer 217a, b, 417a, 417b. In this regard, the one or more ADCs 213a, b, 413a, 413b can read the voltage on each ramp capacitor 219a, b, 419a, b and provide the ramp voltage to the TOF module 209, 409. This allows the TOF module 209, 409 to determine a TOF as a function of a difference of voltage between a starting voltage of the one or more voltage ramps 211, 411 and the ramp capacitor 219a, b, 419a, b voltage, which indicates an amount of time that has passed. In certain embodiments, no dedicated clock mechanisms are needed. In certain embodiments, a system 200, 400 can include a plurality of pixels 203, 403, and can utilize a single voltage ramp 211 and/or ADC (or group of ADCs) common to all of the pixels 203, 403, for example.

The one or more trigger switches 207a, b, 407a, b can be disposed between each column buffer 217a, b, 417a, b and the voltage buffer 215, 415 connected to the at least one voltage ramp 211, 411, for example. Any other suitable position is contemplated herein.

The pulse trigger assembly 203, 403 can include a diode 219, 419 and an amplifier 221, 421 connected to the diode 219, 419 to receive a voltage therefrom. The diode 219, 419 can be biased with a cathode voltage as appreciated by one having ordinary skill in the art. The pulse trigger assembly 203, 403 can include one or more hi-pass filters 223a, 223b, 423 connected to the amplifier 221, 421, a comparator 225a, 225b, 425a, 425b for each of the one or more threshold voltages, and a voltage threshold trigger line 227a, 227b, 427a, 427b connecting a respective comparator 225a, b, 425a, b to a respective trigger switch 207a, b, 407a, b of the one or more trigger switches 207a, b, 407a, b. As shown in FIG. 2, the hi-pass filters 223a, b can be common components with the comparators 225a, b. In certain embodiments, e.g., as shown in FIG. 4, the hi-pass filter 423 can be separate from the comparators 425a, b. Any suitable delineation of components is contemplated herein. The one or more trigger switches 207a, b can be any suitable type of switch configured to be controlled, e.g., by a control voltage applied to a gate thereof.

As shown in FIG. 2, the pulse trigger assembly 203, 403 can include one or more TOF mode switches 229a, 229b configured to selectively allow the one or more trigger switches 207a, b to be operated. As shown in FIG. 4, a single TOF mode switch 429 can be used to selectively allow the ramp voltage to the one or more trigger switches 407a, b.

As shown in FIGS. 2 and 4, the one or more trigger switches 207a, b, 407a, b can include a first trigger switch 207a, 407a and a second trigger switch 207b, 407b connected to a first comparator 225a, 425a and a second comparator 225b, 425b, respectively, and configured to be activated at a first threshold voltage (e.g., $V_{th1}$) of the pulse and a second threshold voltage (e.g., $V_{th2}$) of the pulse, respectively. For example, when the received voltage from the diode 219, 419 is at or above the first threshold, e.g., $V_{th1}$, the first comparator 225a, 425a can output a signal to the line 227a, 427a to close the first trigger switch 207a, 407a. The second trigger switch 207b, 407b, and/or any other suitable number of trigger switches can be operated in a similar manner.

Figure 3A:
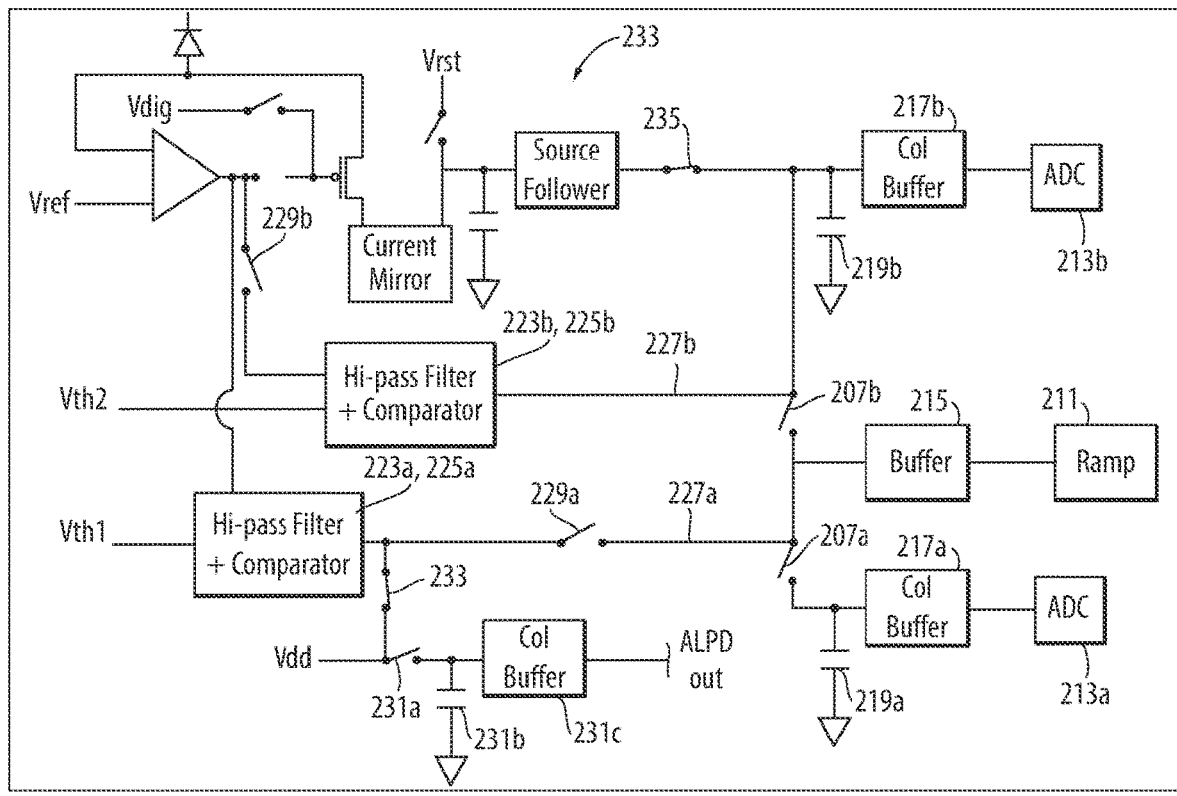
FIG. 3A is a schematic diagram of the embodiment of FIG. 2, shown with a passive imaging mode and asynchronous laser pulse detection (ALPD) mode contemporaneously enabled.
Figure 3B:
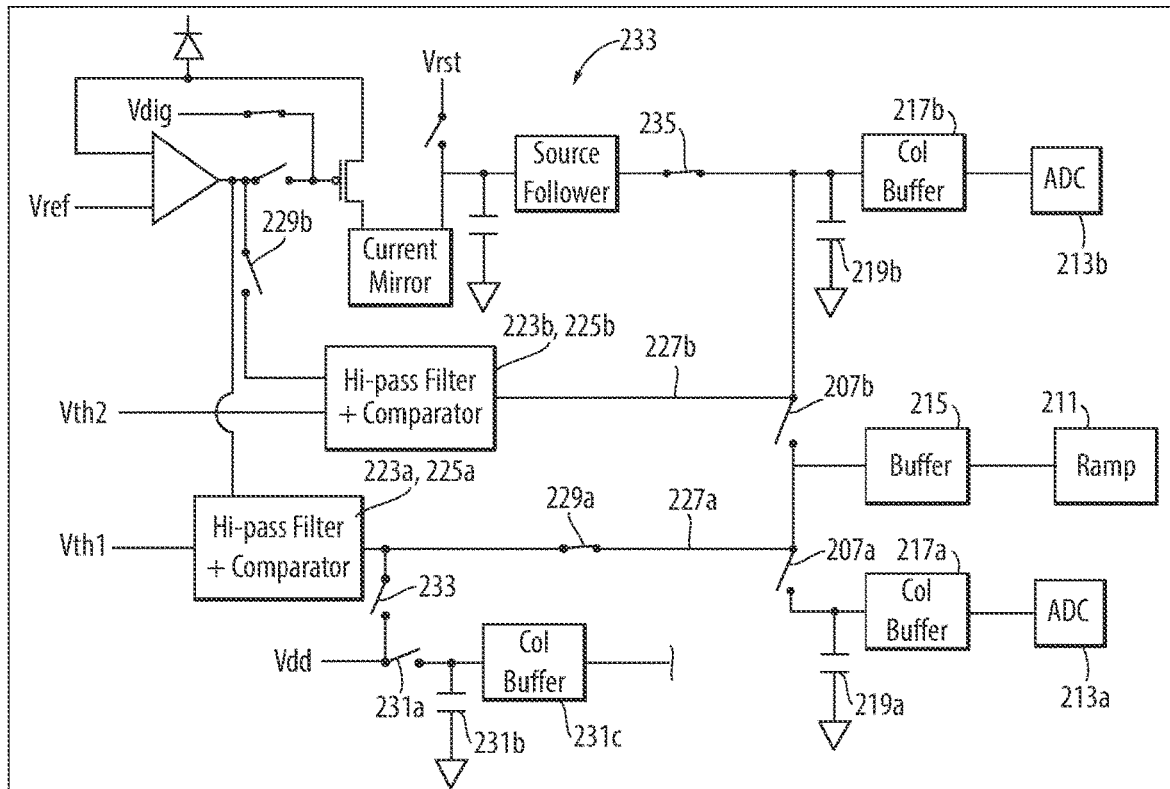
FIG. 3B is a schematic diagram of the embodiment of FIG. 2, shown with a first time of flight (TOF) mode and a passive imaging mode contemporaneously enabled.
Figure 3C:
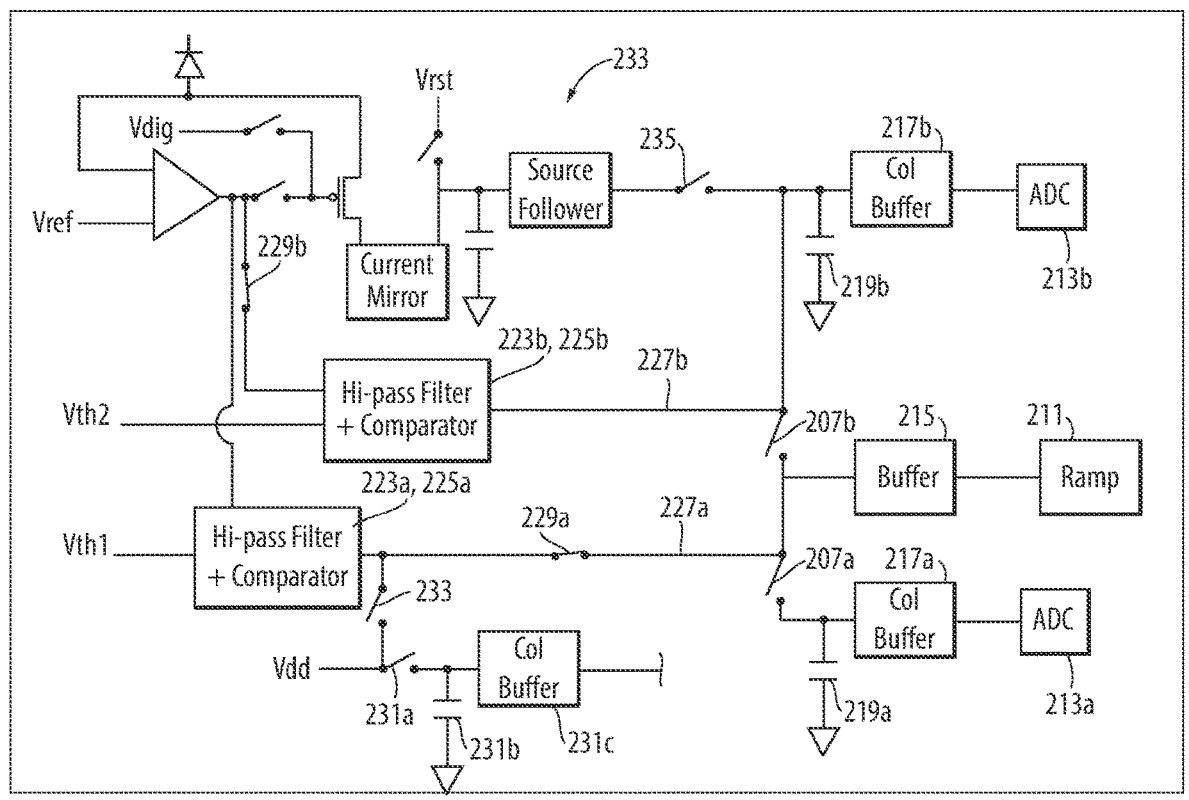
FIG. 3C is a schematic diagram of the embodiment of FIG. 2, shown with the first TOF mode and a second TOF mode contemporaneously enabled, wherein passive imaging mode and ALPD mode are disabled.

As shown in FIG. 2, the one or more TOF mode switches 229a, 229b can include a first TOF switch 229a and a second TOF switch 229b. In a first TOF mode (e.g., as shown in FIG. 3B), the first TOF switch 229a can be activated such that the first trigger switch 207a can be activated. In a second TOF mode (e.g., as shown in FIG. 3C), the second TOF switch 229b can be activated such that the second trigger switch 207b can be activated.

The pulse trigger assembly 203, 403 and/or the pixel 201, 401 can include an asynchronous laser pulse detection (ALPD) system 231, 431 selectively connected to the first threshold trigger voltage line 227a, 427a, e.g., via an ALPD mode switch 233 as shown in FIG. 2, or without a switch as shown in FIG. 4. The ALPD system 231 can be connected between the first comparator 225a, 425a and the first TOF mode switch 229a, for example (e.g., as shown in FIG. 2). As shown in FIG. 4, it is contemplated that the ALPD system 231 can be in parallel with the threshold trigger voltage line 427a without a switch in between, e.g., as in FIG. 2. Any other suitable location is contemplated herein.

As shown in FIG. 2, the first TOF mode switch 229a can be between the first comparator 225a and the first trigger switch 207a. In certain embodiments, the second TOF mode switch can be connected between the amplifier 221 and the second comparator 225b. Any other suitable position is contemplated herein. In certain embodiments, the ALPD system 231, 431 can include suitable components to output a signal to a control module (e.g., the TOF module 209) to indicate that a pulse was received, but not able to provide data indicative of TOF. For example, the ALPD system 231 can include a pulse switch 231a activated by a voltage from the first comparator 225a to allow a voltage $V_{dd}$ to act on a capacitor 231b. A column buffer 231c can be connected to a suitable ADC (not shown) that can be connected to a control module to read when the voltage in the capacitor 231b is at $V_{dd}$. The control module can then determine that a pulse has occurred, e.g., without determining a TOF.

Figure 5A:
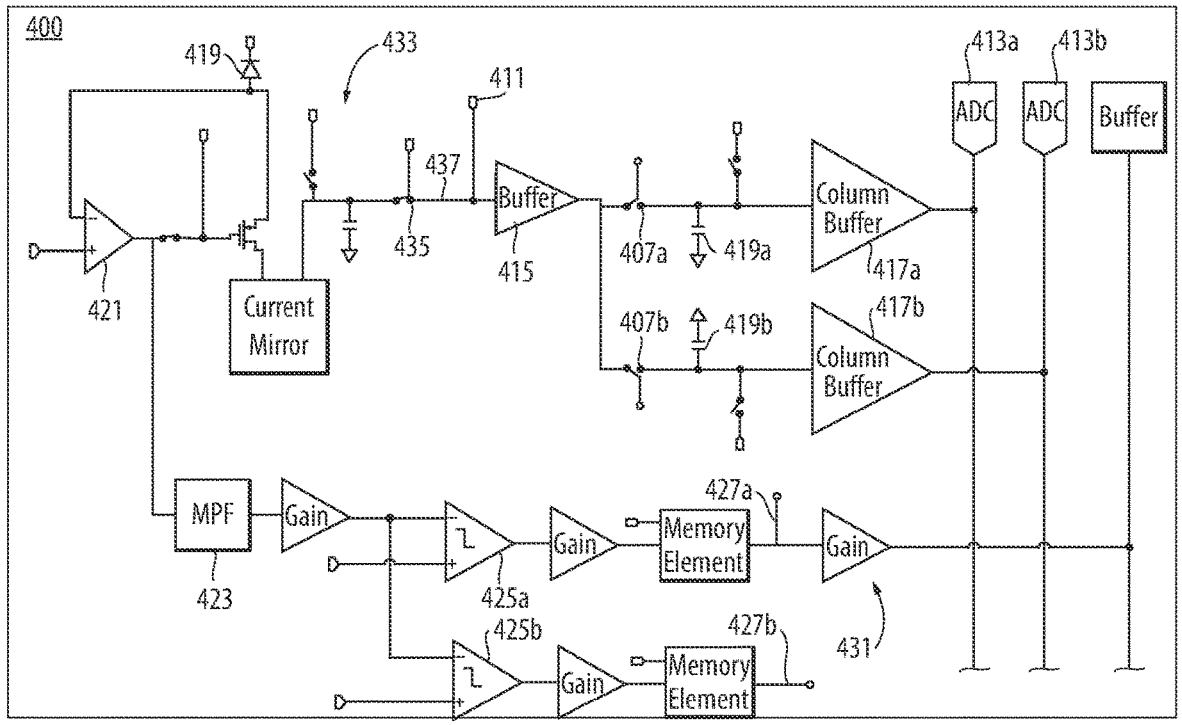
FIG. 5A is a schematic diagram of the embodiment of FIG. 4, shown with a passive imaging mode and ALPD mode enabled, wherein TOF modes are disabled.
Figure 5B:
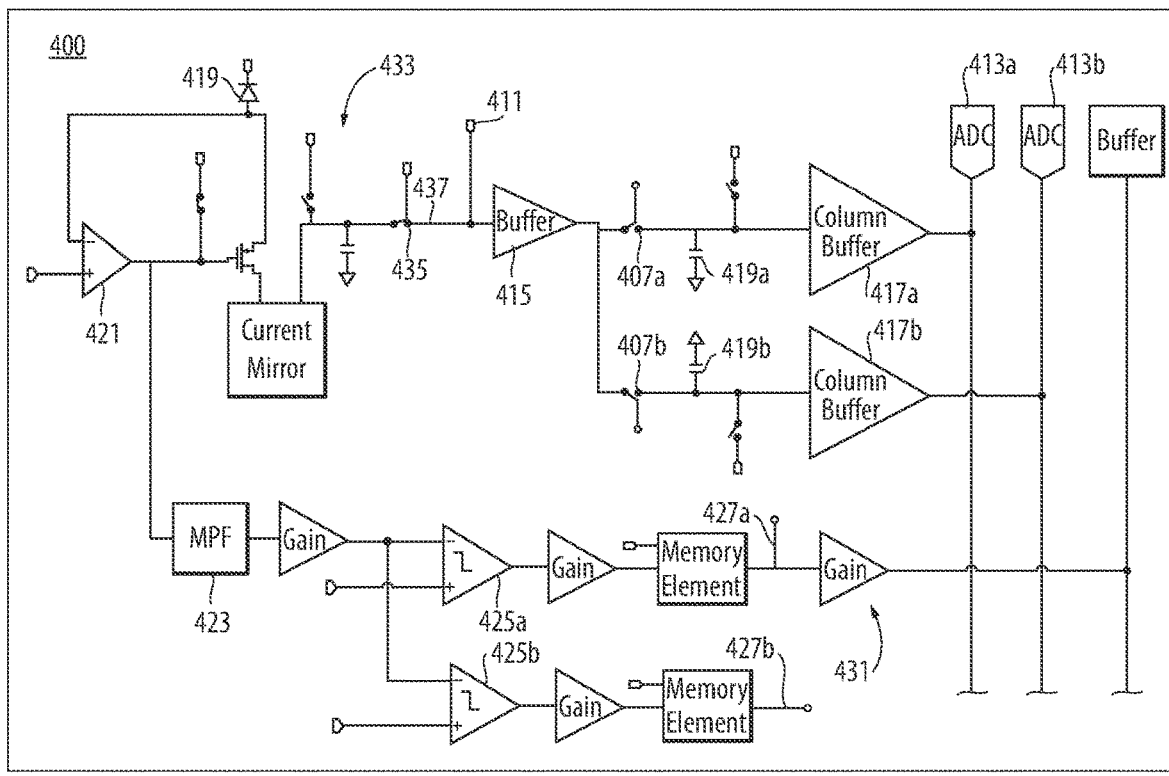
FIG. 5B is a schematic diagram of the embodiment of FIG. 4, shown with a passive imaging mode enabled.
Figure 5C:
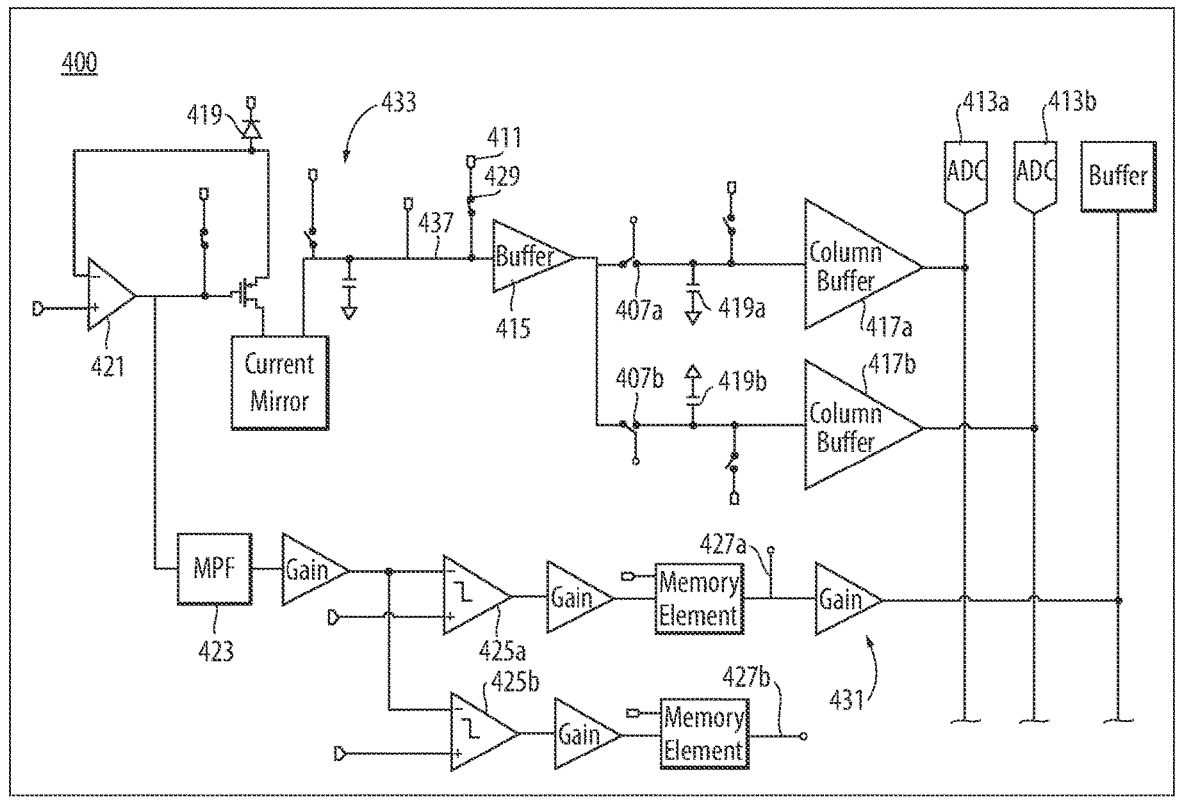
FIG. 5C is a schematic diagram of the embodiment of FIG. 4, shown with a first TOF mode, a second TOF mode, and an ALPD mode enabled, wherein a passive imaging mode is disabled.

In certain embodiments, the pixel 201, 401 can include a passive imaging system 233, 433 connected to the diode 219, 419. The passive imaging system 433 can include at least one passive imaging mode switch 235, 435 configured to allow a passive imaging signal from the diode 219, 419 to be output to at least one of the one or more ADCs (e.g., second ADC 213b, 413b) in a passive imaging mode (e.g., as shown in FIGS. 3A, 5A, and 5B). The pixel 201 can be configured such that the passive imaging mode can be activated with the first TOF mode (e.g., as shown in FIG. 3B), but not with the second TOF mode (e.g., as shown in FIGS. 3C and 5C). As shown in FIGS. 3A and 5A, the ALPD mode can be activated with the passive imagine mode, or passive imaging mode may be separate (e.g., FIG. 5B).

As shown in FIGS. 3C and 5C, the one or more pixels 201 can be configured such that first TOF mode and the second TOF mode are activatable together to provide multi-threshold readings to allow the TOF module to reduce or eliminate one or more errors. Any other suitable combination of modes is contemplated herein.

The embodiments of FIGS. 2 and 4 can be configured to function similarly. The embodiment of FIG. 4 can include a different arrangement of parts, e.g., to reduce part count compared to the embodiment of FIG. 2. For example, in certain embodiments, the one or more high-pass filters can include a single high pass filter 423 operatively connected to each comparator 425a, b. The voltage ramp 411 can be connected to a passive imaging line 437 by a ramp switch (e.g., TOF mode switch 429) in front of the voltage buffer 415. In certain embodiments, e.g., as shown in FIG. 4, the voltage ramp can be buffered into pixel to alleviate kickback noise, a buffer can be reused from what would be the passive imaging readout path, an integration cap can be disconnected via opening passive mode switch. In certain embodiments, the voltage ramp can be disconnected and the integration cap connected to the buffer, rst2 enabled according to an ALPD readout, and rst1 can remain disabled until passive imaging readout occurs, and the ADC for TOF2_out can be disabled.

In accordance with at least one aspect of this disclosure, a pixel can include any suitable embodiment of a pixel, e.g., pixel 201, 401, disclosed herein (e.g., as described above). For example, a pixel can include a pulse trigger assembly configured to detect a pulse at one or more threshold voltages, and a timer system connected to the pulse trigger assembly, the timer system comprising one or more trigger switches. The pulse trigger assembly can be configured to activate the one or more trigger switches in response to detecting the pulse at the one or more threshold values. The timer system can include a voltage buffer configured to connect to at least one voltage ramp, one or more column buffers configured to connect one or more respective analog-digital converters (ADCs), wherein the one or more trigger switches are disposed between each column buffer and the voltage buffer, and one or more ramp capacitors connected to each column buffer for receiving a voltage from the voltage ramp. The pulse trigger assembly can include a diode, an amplifier connected to the diode to receive a voltage therefrom, one or more hi-pass filters connected to the amplifier, a comparator for each of the one or more threshold voltages, a voltage threshold trigger line connecting a respective comparator to a respective trigger switch of the one or more trigger switches, and one or more TOF mode switches configured to selectively allow the one or more trigger switches to be operated. The one or more trigger switches can include a first trigger switch and a second trigger switch connected to a first comparator and a second comparator, respectively, and configured to be activated at a first threshold voltage of the pulse and a second threshold voltage of the pulse, respectively.

In accordance with at least one aspect of this disclosure, a method can include determining a time-of-flight (TOF) of an output signal by first determining that a pulse was received at a pixel at two or more threshold voltages to determine a single time value of receiving the pulse. The method can then include using a voltage ramp to compare an initial voltage to a ramp voltage at the single time value of receiving the pulse to determine a voltage difference and then correlating the voltage difference the TOF based on correlation data. The method can further include selecting between a TOF multi-threshold mode and a different mode of operation.

In certain embodiments, the method can include receiving a data point for each of a plurality of thresholds, and extrapolating a single time-of-arrival value from the plurality of data points. For example, the TOF module 209, 409 can perform this function (e.g., by linearly extrapolating/ estimating a time-of-arrival from the threshold crossing times). The method can include correlating a plurality of threshold crossings to a respective pulse signal. The method can include using the single time of arrival to calculate a TOF. The method can include eliminating ambiguities, e.g., to determine two signals of same arrival time have arrived by determining a single time-of-arrival matches between the two signals within at least an error range, or to determine that a simultaneous threshold crossing involved two or more non-contemporaneous signals. The method can include any other suitable method(s) and/or portion(s) thereof. A suitable method disclosed herein can be stored on computer readable medium and/or otherwise executable by a suitable computer.

In accordance with this disclosure, a laser pulse can shine on the diode (e.g., a photosensitive element) and generate a voltage pulse. An amplifier can amplify this input signal as a function of a reference voltage (e.g., $V_{ref}$). The output from the amplifier can be sent to a first high-pass filter and/or comparator to be compared to a first threshold (e.g., $V_{th1}$, predetermined set voltage). When amplifier output is as high as the threshold or higher, the comparator can output a signal to activate (e.g., close a trigger switch).

A voltage ramp can be used to time a flight of a signal. For example, when a laser signal is first transmitted, the voltage ramp can ramp at a fixed rate, e.g., 200 mV per second. A TOF module can mark the beginning voltage and/or time use this later to calculate TOF. When the pulse is received and the trigger switch activated, the ramp voltage can be read and correlated to a time, thus giving a TOF.

Certain embodiments can also include a passive imaging system. In certain embodiments, a passive capacitor can obtain voltage from current mirror connected to the diode. An ADC can read the passive capacitor voltage. In certain embodiments, the passive imaging system can share one or more components (e.g., a capacitor, buffer, and/or ADC) with the timing system such that in a passive mode, the components are used to read passive signals, and in a TOF mode, the components are used to read ramp voltage when a pulse is detected.

A voltage ramp can be beneficial because certain imaging devices can already include on onboard. Ramping a voltage and clamping to digitize a voltage at trigger point is just one embodiment of recording time. Embodiments can include additionally or alternatively one or more digital counters to count the time passed and directly send out digital signal. For example, it is contemplated that a counter or clock could be used, for example, but would be more power intensive and take up more space than using the voltage ramp.

Figure 6:
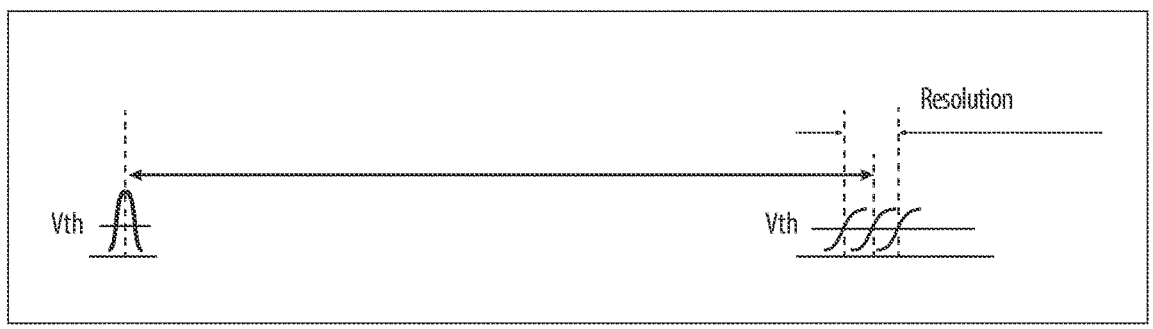
FIG. 6 is schematic diagram showing a single threshold TOF measurement.

Embodiments provide a system that performs improved time of flight measurements. Embodiments allow multi-threshold (e.g., at least dual threshold) monitoring of pulse signals. Embodiments can include a duplicated second path for a second threshold (e.g., $V_{th2}$) that is different than $V_{th1}$. Embodiments can allow independent and simultaneous measurements of samples on multiple capacitors allowing two points of data. As shown in FIG. 6, a single threshold measurement can be taken, but will provide an error, which may or may not be acceptable or desirable.

Figure 7:
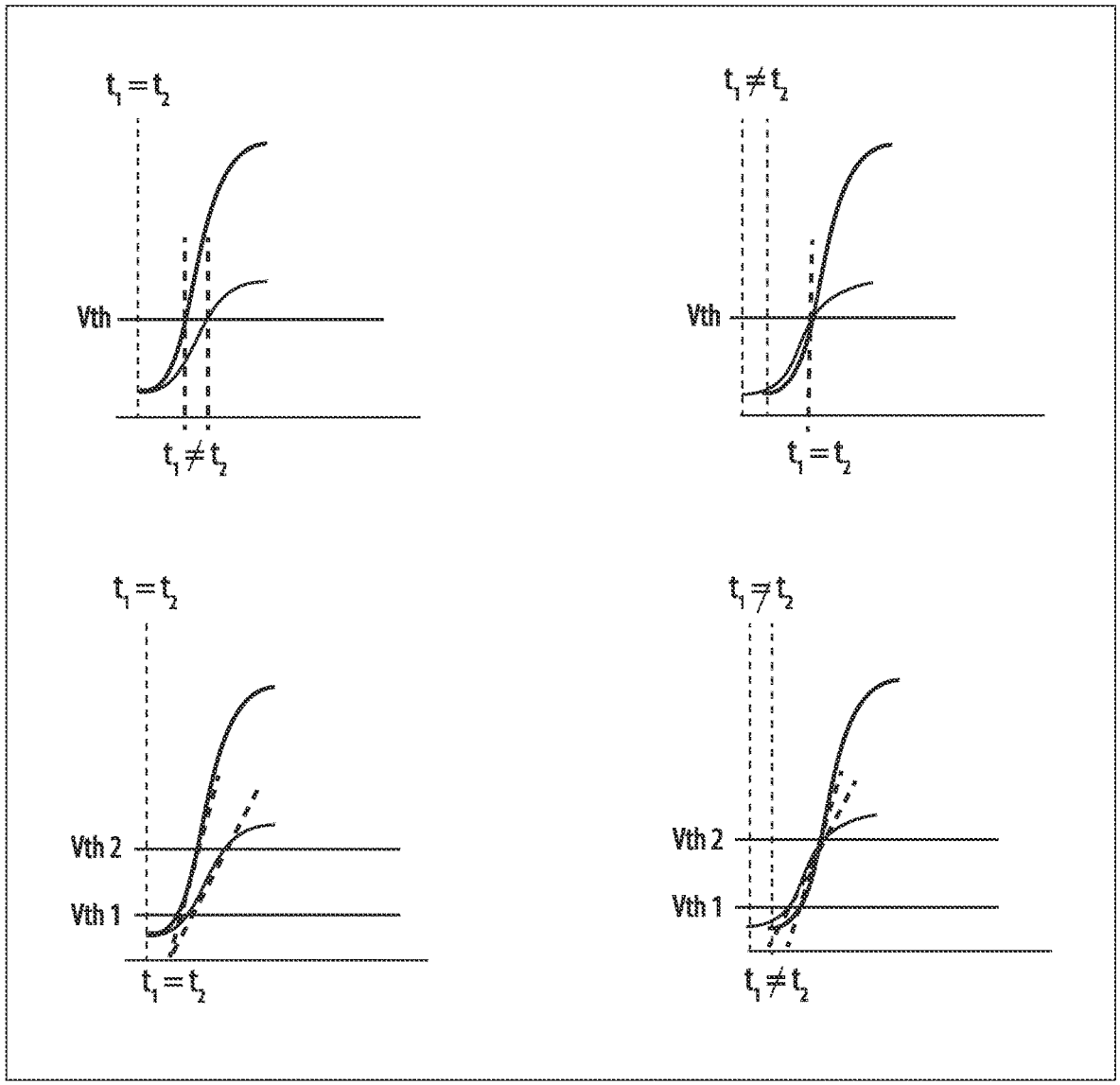
FIG. 7 is a series of diagrams showing differences between single threshold TOF measurement and a multi-threshold (e.g., two) TOF measurement.

As shown in FIG. 7, a comparison between single threshold and dual threshold measurements shows the benefits of using dual threshold measurements. As can be seen, with dual threshold measurements (bottom FIG. 7), having two data points allows the TOF module (e.g., 209, 409) to extrapolate the data points to a line to allow a more accurate determination of the signal type and time of flight. For example, where a single threshold measurement falsely views contemporaneous signals of different amplitudes (e.g., the same signal bouncing off of two different materials at the same distance, FIG. 7 top left) as two different signals, a dual threshold system allows the points of intersection to form a line that intersects the time axis, showing that, regardless of the amplitude, the signals arrive at the same time (indicating a single signal was reflected off of multiple surfaces, for example, FIG. 7, bottom left). Where a single threshold measurement falsely views multiple signals arriving at different times as a single signal (e.g., FIG. 7 top right), a dual threshold measurement correctly separates the two separate signals into two different arrival times. Using the times generated by the multi-threshold approach, the TOF module can extrapolate a more accurate time of arrival and use that value to calculate TOF (e.g., for ranging the target).

Embodiments can detect pulse twice within a single pulse and reduce time/depth ambiguity caused by signal amplitude, for example. Certain embodiments add a new mode for TOF detection with minimal additional transistors, for example. The new mode allows two samples of a single laser pulse signal waveform and a simultaneous readout and appropriate processing of the simultaneous readout. Embodiments can eliminate or mitigate the motion artifacts and reduces the depth ambiguity due to other reasons that cause signal amplitude difference, like target reflectivity differences, backscatter, etc. Embodiments can still support TOF signal calibration via a TOF imaging path. Embodiments of gain/buffer components can have adjustable gain and bandwidth via bias current adjustment, the corner frequency of the high pass filters can be voltage adjustable, a current mirror current gain/attenuation can be adjustable, In certain embodiments, during a TOF mode, input PMOS TX can be connected to $V_{dd}$ or separate voltage to maintain DI behavior.

Certain pixel/readout block diagrams are shown herein, for example. Any components not herein described and shown in the drawings can be readily understood have a function as appreciated by one having ordinary skill in the art at least in view of this disclosure. Embodiments can implement improved fidelity and direct time-of-flight (TOF) imaging with active pulse detection as well as passive imaging. Embodiments allow for obtaining leading edge pulse detection whereby the range/reflectance ambiguity challenge can be mitigated.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A pixel system for an imaging device, comprising:
   one or more pixels, at least one pixel of the one or more pixels comprising a pulse trigger assembly configured to detect a pulse at one or more threshold voltages;
   a timer system forming part of the one or more pixels, the timer system comprising one or more trigger switches, wherein the pulse trigger assembly is configured to activate the one or more trigger switches in response to detecting the pulse at the one or more threshold voltages; and
   a time-of-flight (TOF) module operatively connected to the one or more pixels and/or the timer system and configured to determine a TOF based on an output from the timer system;
   wherein the timer system includes at least one voltage ramp configured to allow the TOF module to determine the TOF based on a voltage value of the at least one voltage ramp that changes over time; and
   wherein the TOF module is configured to determine the TOF without recording a time of detection of the pulse at the one or more threshold voltages.

2. The pixel system of claim 1, wherein the timer system includes one or more analog-digital converters (ADCs) configured to receive the voltage value from the at least one voltage ramp when the one or more trigger switches are activated by the pulse.

3. The pixel system of claim 2, wherein the one or more pixels include:
   a voltage buffer connected to the at least one voltage ramp;
   a column buffer connected to each of the one or more ADCs; and
   a ramp capacitor connected to the column buffer; and
   wherein the one or more trigger switches are disposed between each column buffer and the voltage buffer.

4. The pixel system of claim 3, wherein the pulse trigger assembly includes:
   a diode;
   an amplifier connected to the diode and configured to receive a voltage therefrom;
   one or more high-pass filters connected to the amplifier;
   a comparator for each of the one or more threshold voltages; and
   a voltage threshold trigger line connecting a respective comparator to a respective trigger switch of the one or more trigger switches.

5. The pixel system of claim 4, wherein the pulse trigger assembly includes one or more TOF mode switches configured to selectively allow the one or more trigger switches to be operated.

6. The pixel system of claim 5, wherein the one or more trigger switches include a first trigger switch and a second trigger switch connected to a first comparator and a second comparator, respectively, and configured to be activated at a first threshold voltage of the pulse and a second threshold voltage of the pulse, respectively.

7. The pixel system of claim 6, wherein:
   the one or more TOF mode switches include a first TOF switch and a second TOF switch;
   in a first TOF mode, the first TOF switch is activated such that the first trigger switch is able to be activated; and
   in a second TOF mode, the second TOF switch is activated such that the second trigger switch is able to be activated.

8. The pixel system of claim 7, wherein the pulse trigger assembly includes an asynchronous laser pulse detection (ALPD) system selectively connected to the voltage threshold trigger line via an ALPD mode switch.

9. The pixel system of claim 8, wherein:
   the ALPD system is connected between the first comparator and the first TOF switch; and
   the first TOF switch is connected between the first comparator and the first trigger switch.

10. The pixel system of claim 9, wherein the second TOF switch is connected between the amplifier and the second comparator.

11. The pixel system of claim 9, wherein:
    the one or more pixels include a passive imaging system connected to the diode; and
    the passive imaging system includes at least one passive imaging mode switch configured to allow a passive imaging signal from the diode to be output to at least one of the one or more ADCs in a passive imaging mode.

12. The pixel system of claim 11, wherein:
    the one or more pixels are configured such that the passive imaging mode is able to be activated with the first TOF mode but not with the second TOF mode; and
    an ALPD mode is able to be activated with the passive imagine mode.

13. The pixel system of claim 7, wherein the one or more pixels are configured such that the first TOF mode and the second TOF mode are activatable together to provide multi-threshold readings to allow the TOF module to reduce or eliminate one or more errors.

14. The pixel system of claim 12, wherein the one or more high-pass filters include a single high-pass filter operatively connected to each comparator.

15. The pixel system of claim 14, wherein the at least one voltage ramp is connected to a passive imaging line by a ramp switch in front of the voltage buffer.

16. A pixel, comprising:
a pulse trigger assembly configured to detect a pulse at one or more threshold voltages; and
a timer system comprising one or more trigger switches, wherein the pulse trigger assembly is configured to activate the one or more trigger switches in response to detecting the pulse at the one or more threshold voltages, wherein the timer system includes:
  a voltage buffer configured to connect to at least one voltage ramp;
  one or more column buffers configured to connect to one or more respective analog-digital converters (ADCs), wherein the one or more trigger switches are disposed between each column buffer and the voltage buffer; and
  one or more ramp capacitors connected to each column buffer and configured to receive a voltage from the at least one voltage ramp;
wherein the pulse trigger assembly includes:
  a diode;
  an amplifier connected to the diode and configured to receive a voltage therefrom;
  one or more high-pass filters connected to the amplifier;
  a comparator for each of the one or more threshold voltages;
  a voltage threshold trigger line connecting a respective comparator to a respective trigger switch of the one or more trigger switches; and
  one or more time-of-flight (TOF) mode switches configured to selectively allow the one or more trigger switches to be operated, wherein the one or more trigger switches include a first trigger switch and a second trigger switch connected to a first comparator and a second comparator, respectively, and configured to be activated at a first threshold voltage of the pulse and a second threshold voltage of the pulse, respectively;
wherein a TOF of the pulse is based on the voltage of the at least one voltage ramp.

17. The pixel of claim 16, wherein:
the one or more TOF mode switches include a first TOF switch and a second TOF switch;
in a first TOF mode, the first TOF switch is activated such that the first trigger switch is able to be activated; and
in a second TOF mode, the second TOF switch is activated such that the second trigger switch is able to be activated.

18. A method, comprising:
determining a time-of-flight (TOF) of an output signal by:
  receiving a pulse at a pixel;
  determining that the received pulse crossed a plurality of threshold voltages;
  determining a single time value at which the pulse was received based on the crossing of the plurality of threshold voltages;
  using a voltage ramp to compare an initial voltage to a ramp voltage at the single time value to determine a voltage difference; and
  obtaining a TOF value by correlating the voltage difference based on correlation data, wherein the TOF value is determined without determining a time interval between the crossing of the plurality of threshold voltages.

19. The method of claim 18, further comprising selecting a TOF multi-threshold mode.

20. The pixel system of claim 1, wherein the timer system does not include a dedicated clock.

* * * * *